United States Patent [19]
Kitamura

[11] 4,366,492
[45] Dec. 28, 1982

[54] SEMICONDUCTOR LASER DEVICE

[75] Inventor: Takashi Kitamura, Yokohama, Japan

[73] Assignee: Canon Kabushiki Kaisha, Tokyo, Japan

[21] Appl. No.: 147,173

[22] Filed: May 6, 1980

[30] Foreign Application Priority Data

May 8, 1979 [JP] Japan .................................. 54-56793

[51] Int. Cl.³ .......................... G01D 15/14; H01S 3/19
[52] U.S. Cl. ...................................... 346/160; 357/74; 372/36
[58] Field of Search .................... 331/94.5 H, 94.5 M, 331/94.5 S; 357/17-19, 74; 346/160; 372/36, 44

[56] References Cited

U.S. PATENT DOCUMENTS

| | | | |
|---|---|---|---|
| 4,123,591 | 10/1978 | Karki | 428/454 |
| 4,243,951 | 1/1981 | Wolkstein et al. | 331/94.5 S |
| 4,251,825 | 2/1981 | Mikami et al. | 346/160 |
| 4,259,679 | 3/1981 | Knibb et al. | 357/17 |
| 4,270,134 | 5/1981 | Takeda et al. | 331/94.5 H |

*Primary Examiner*—James W. Davie
*Attorney, Agent, or Firm*—Fitzpatrick, Cella, Harper & Scinto

[57] ABSTRACT

A semiconductor laser device of a construction, wherein projection of a laser beam (or rear beam) backwardly from a semiconductor laser element in the device is prevented.

19 Claims, 6 Drawing Figures

SEMICONDUCTOR LASER DEVICE

BACKGROUND OF THE INVENTION

1. Field of the Invention

This invention relates to a semiconductor device which has a semiconductor laser element, and functions to project a laser beam from the semiconductor laser element, while protecting the laser element.

2. Description of Prior Arts

It has heretofore been a practice to provide a casing (such as one designated by a reference numeral 1 in FIG. 1 of the accompanying drawings) about a semiconductor laser device for preventing environmental pollution, and to project a light beam as the laser output through an optical window 2 provided in the casing 1.

In view, however, of the fact that the semiconductor laser element 3 used in this device emits light beam from both ends thereof, there inevitably arises a problem that, rather than only one of the light beams, i.e., a front beam 4 alone, being projected out of the optical window as mentioned above, the other light beam, i.e., the rear beam 5, is also reflected within the casing 1 to mix with the front beam 4.

Thus, when the rear beam mixes with the front beam, a problem arises that no accurate measurement of the light beam from the semiconductor laser device can be made, because the light intensity differs from point to point on the optical window. Also, it is of great concern that ghost and other undesirable phenomena may occur depending on a positional relationship of the device at the time of its use. Such situations constitute inconveniences and disadvantages when the semiconductor laser device per se is evaluated, or when it is used as a recording device.

SUMMARY OF THE INVENTION

In view of the above, the purpose of the present invention is to provide a semiconductor laser device which minimizes the abovementioned disadvantages inherent in conventional laser devices.

It is therefore the primary object of the present invention to provide an improved semiconductor laser device which does not produce a ghost, or other spurious effects due to reflection of a rear beam from within the laser device.

It is the secondary object of the present invention to provide an image recording device utilizing such an improved semiconductor laser device.

The foregoing objects, other objects as well as the detailed construction and operations of the semiconductor laser device according to the present invention will become more apparent from the following description of preferred embodiments of the invention when read in conjunction with the accompanying drawings.

DETAILED DESCRIPTION OF PREFERRED EMBODIMENTS

In the following, the present invention will be described in detail in reference to FIGS. 2 to 6.

Figure 1:
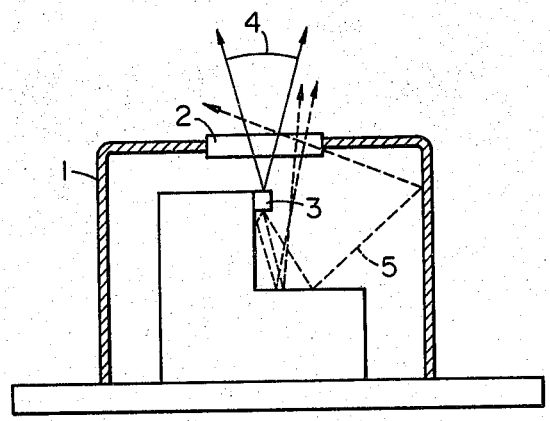
FIG. 1 is a schematic view in longitudinal cross-section of a semiconductor laser device of a known type.
Figure 2:
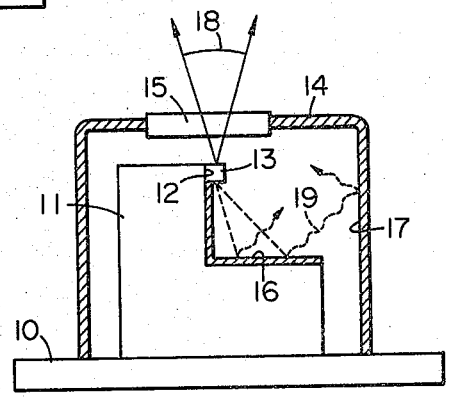
FIG. 2 is a schematic view in longitudinal cross-section of one embodiment of the semiconductor laser device according to the present invention.

Referring to FIG. 2 showing the first embodiment of the semiconductor laser device according to the present invention, a mount 11 made of copper, or the like is fixedly provided on a base 10 which is generally made of a metal material and in a circular disc shape. On the vertical surface 12 of this mount 11, there is fixed a semiconductor laser element 13. This semiconductor laser element 13 is operated by a known driving unit provided with a laser drive circuit, and other components: In this embodiment, the laser element emits light beams having wavelength of the infrared rays in both upper and lower directions.

On the base 10, there is also tightly fitted a metal cap or casing 14 which covers the semiconductor laser element 13 and the mount 11 to isolate them from the external atmosphere. At the top center part of this metal cap 14, there is mounted an optical window 15 through which the light beam (front beam) 18 from the element 13 can be projected.

On the light beam reflecting surface of the mount 11 and the inner surface of the metal casing 14, there are respectively coated reflection preventive films 16, 17 composed of nigrosine as an absorbent material and lacquer as a binder. Further, a matting or de-lustering agent having large scatter properties may be coated on the reflection preventive films 16, 17. The scatter becomes greater by mixing powdery silica having a large particle size with this matting agent. In this way, the quantity of rear beam emitting from the optical window can be minimized.

In this embodiment, when the semiconductor laser element 13 is operated, the front beam 18 projects outside through the optical window 15, while the rear beam 19 projects in the downward direction and is absorbed into the initial reflection preventive film 16 to be attenuated. The remaining rear beam which has been scattered at this reflection preventive film 16 is further absorbed into and attenuated by the second reflection preventive film 17 to a substantial degree.

According to this embodiment, therefore, the rear beam which has so far been projected from the optical window at a rate of approximately 35% in known devices can be reduced to a rate of projection of about 4% or so.

Nigrosine as the absorbing material is effective in absorbing the light beam in a wavelength region of infrared rays. The matting agent and the silica powder have the effect of scattering the reflected beams. It is to be noted also that carbon black is as effective as nigrosine in absorbing the infrared light. Therefore this material can be directly coated on the rear beam reflecting surface, or can be attached to the reflecting surface in a sheet form.

Figure 3:
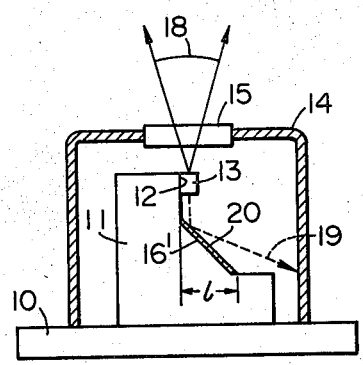
FIG. 3 is also a schematic view in longitudinal cross-section of another embodiment of the semiconductor laser device according to the present invention.

Referring now to FIG. 3 which shows the second embodiment of the present invention, the mount 11 has an inclined rear beam reflecting surface 20, instead of being coated with reflection preventive films as in the first embodiment. The other constructions are exactly same as in the first embodiment.

According to the constructions of this second embodiment, a rear beam 19 is reflected in the direction different from the front beam 18. Hence it is scattered and attenuated within the casing 14. In particular, the absorbing and attenuating effects can be augmented by making the inner surface of the casing 14 coarse. Moreover, a reflection preventive film 16' may be provided on this inclined reflecting surface, the same as mentioned in the foregoing, to further increase the attenuation effects.

Incidentally, when the inclination of the rear beam reflecting surface 20 is too steep, the reflected light of the initial rear beam is possibly emitted from the optical window 15 directly. Therefore, the inclination should desirably be at an appropriate angle.

Further, if it is assumed that the light beam emitting section of the semiconductor laser element 13 is directly below the center of the optical window 15, the horizontal length 1 of the rear beam reflecting surface 20 may be of a length ¼ or more of the maximum diameter of the optical window from its center, whereby the rear beam 19 is not projected directly outside, but can be scattered and attenuated within the casing 14.

Figure 4:
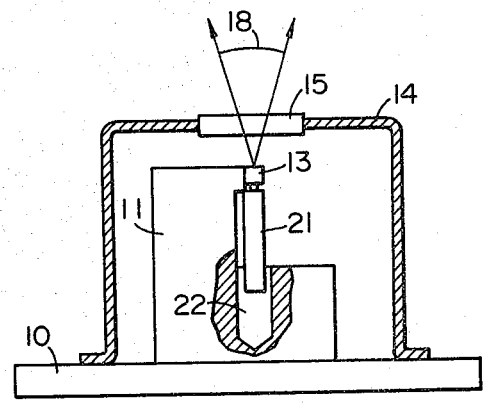
FIG. 4 is a schematic view in longitudinal cross-section of still another embodiment of the semiconductor laser device according to the present invention.

Referring to FIG. 4 which illustrates the third embodiment of the present invention, a fiber cable 21 for collecting the rear beam is provided beneath the semiconductor laser element 13 with its bottom end part being inserted or embedded into a cavity 22 formed in the mount 11. The other constructions are exactly same as that of the FIG. 3 embodiment.

The cavity 22 is to scatter and attenuate the rear beam collected by fiber cable 22. The inner surface of the cavity is made properly coarse.

It has been found that, when this device is operated, the leaking quantity of the rear beam through the optical window 15 is as extremely small as 3 to 4% of the intensity of the front beam.

Thus, while provision within the casing of a cavity to scatter and attenuate the light beam produces a remarkable effect, it is further desirable to use the reflection preventive film, the inclined reflecting surface, and so forth in this internal cavity to yield more effect, whereby rear beam projection from the optical window is minimized.

The above-described construction of the semiconductor laser device is intended to attenuate the rear beam within the casing. It is also effective to construct the device in such a manner that the rear beam is projected outside the casing for disposition by use of a simple optical system such as the fiber cable 21 in FIG. 4.

As described in the foregoing, the semiconductor laser device according to the present invention provides a rear beam attenuating means which causes the rear beam to be absorbed, scattered and attenuated within the casing, thereby preventing the rear beam of the semiconductor laser element from being mixed with the front beam and emitted from the casing together with it. In consequence of this, the intensity distribution of the front beam at every metering position of the optical window can be made fairly uniform, and moreover no ghost occurs due to the rear beam, which makes it possible to accurately evaluate the semiconductor laser device per se, and also accurately evaluate the result of recording, when the semiconductor laser deivce is used for the image recording. Various other advantages are also provided.

Figure 5:
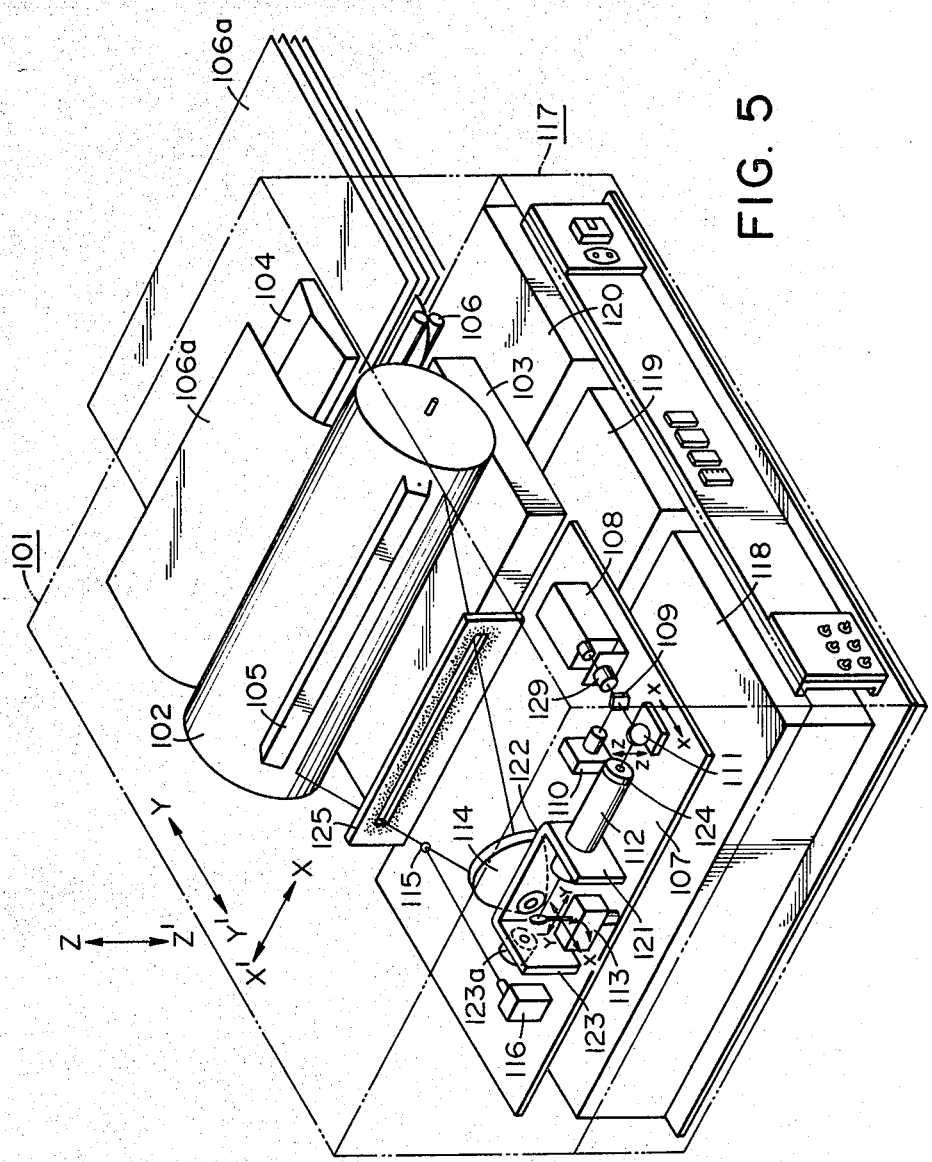
FIG. 5 is a perspective view showing the interior of a laser recording device.

In the following, one embodiment of an image forming device which is suited for incorporating therein the semiconductor device according to the present invention as described so far will be explained with detail in reference to FIG. 5.

In the drawing, a reference numeral 101 designates recording section utilizing the electrophotographic process, which comprises a photosensitive drum 102, an image developer 103, a thermal image fixing device 104, a charger 105, a paper feeding mechanism 106, recording paper 106a, and other known components. An electrostatic latent image formed on the photosensitive drum 102 by the well known electrophotographic process based on an image light is visualized by the charger 105 and the image developer 103. The developed image based on the abovementioned latent image is then printed onto the recording paper 106a fed by feeding mechanism 106, and discharged outside as an output. Within the recording section 101, a mounting table is provided for receiving thereon the abovementioned optical elements and various others. On this optical element mounting table 107, the following components are disposed: a semiconductor laser element 108 which is a light source for introducing an image information beam as an input onto the photosensitive drum; a collimator lens 129 to correct the laser beam from an elliptical shape projected from the laser element to a circular shape, since the beam having an elliptical cross-sectional shape has different angles of diversion in its vertical and horizontal directions; a semi-transparent mirror 109 which transmits a part of the laser beam therethrough and which reflects the other; a beam intensity detecting device 110 to which receives the beam reflected by the semitransparent mirror 109 for detecting its intensity; a reflecting mirror 111 to bend the laser beam which has transmitted through the semitransparent mirror 109; a beam expander lens 112 to enlarge the diameter of the beam which has been reflected by the reflecting mirror 111; a galvano mirror scanner 113 to scan the laser beam on the surface of the photosensitive drum 102; an image focusing lens 114 to focus the beam scanned by the scanner 113 onto the surface of the photosensitive drum; a beam position detecting mirror 115 which is provided in the vicinity of a scanning start position of the scanning beam emitted from the image focusing lens 114 and which reflects the scanning beam 115; and beam position detecting device 116 to detect the beam from the mirror 115 and to generate a heading signal.

A power source section 118, a sequence control circuit section 119, and an image signal control circuit section 120 are accommodated in a lower casing 117. A plate 121 having a hole for fitting the expander lens 112 onto the surface of the abovementioned optical element mounting table 107, a plate 122 having a hole for fitting the image focusing lens, and a plate 123 having a hole for establishing the optical axis and further provided with a photo-detector 123a on the rear side of the hole are fixedly secured by mechanical means at their respective positions in such a manner that the centers of the abovementioned holes may be optically aligned. A disc 124 having a hole for establishing the optical axis is fitted at the tip end of the expander lens 112 in a detachably mounted manner so that the center of its hole may coincide with the optical axis of the expander lens 112. On the surrounding surface of the holes in the abovementioned plate 123 and the disc 124, there is coated a fluorescent material which is excited by light of a wavelength in a range of 8,000 to 9,000 angstroms and emits visible light.

The position of the laser beam image can be observed by removing the abovementioned galvano mirror scanner 113 and projecting the laser beam image emitted from the expander lens 112 onto the surface of the fluorescent material coated on the plate 123. The parallel arrangement of the laser beam with the optical axis of the expander lens 112 is done by rotating the reflecting surface of the reflecting mirror 111. As the result of the entire laser beam passing through the holes in the abovementioned plate 123 and the disc 124 by the abovementioned light path adjusting means, the output from the photodetector 123a provided on the plate 123 becomes maximum. The accurate establishment of the light path can be verified by finding out the output from the photo-detector 123a. A plate 125 having a long slit to permit passage of the scanning beam is mechanically fixed at its position on the surface of the optical element mounting table 107 between the image focusing lens 114 and the photosensitive drum 102 in such a manner that the center of the short side of the slit may coincide with the center of the scanning surface of the image focusing lens 114. The abovementioned fluorescent material is coated on the surrounding area of the long slit. By light emission from the fluorescent material on the surface of the plate 125, position of the scanning beam on the plate 125 can be detected.

Figure 6:
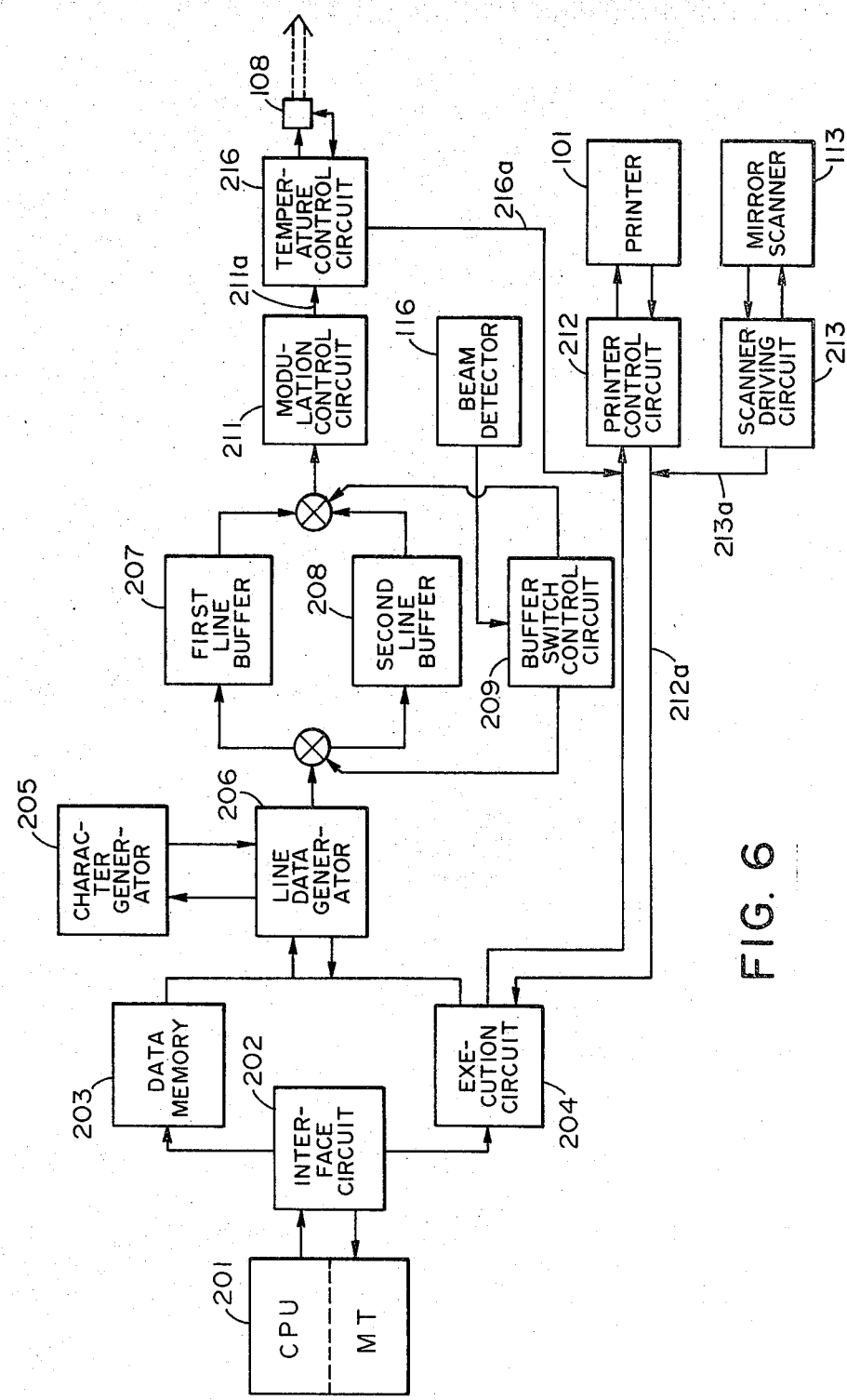
FIG. 6 is a control block diagram of the laser recording device shown in FIG. 5.

In the following, explanation will be given with reference to FIG. 6 of the recording operations beginning from receipt of pattern and character information from a computer upto preparation of desired hard copies by the use of the device as shown in the embodiment of the present invention.

Information from the computer 201 is introduced as inputs into a format formulated in an interface circuit 202 of the device either directly or through a recording medium such as a magnetic tape, a magnetic disc, or the like. Various instructions from the computer are deciphered and executed by an instruction execution circuit 204. Data are stored in a data memory 203 for a certain definite quantity. The form of the data to be stored is given in a binary code in the case of character information. In the case of pattern information, it is given in the form of image unit data constituting the pattern, or line data constituting the pattern (the so-called "vector data"). This mode of the data is designated in advance of the data storage, and the instruction execution circuit 204 controls the data memory 203 and a line data generator 206 in accordance with the designated mode so as to process the data. The line data generator 206 generates the final data for one scan line. In more detail, when the data are given in the form of character codes, it reads out the character patterns from the character generator 205 and buffers the character patterns arranged for one line, or buffers the character codes for one line, after which it sequentially reads out the character patterns from the character generator 205 to prepare the final data for modulating the laser beam for one scan line. Even in the case of the data being pattern information, the data are converted into scan line data to sequentially produce the final data for modulating the laser beam for one scan line. The data for one scan line are alternately introduced as inputs into a first line buffer 207 and a second line buffer 208 comprising shift registers, and other components having the bit numbers equal to the image element numbers for one scan line by the controlling operation of a buffer switch control circuit 209. Further, the data in the first line buffer 207 and the second line buffer 208 are sequentially read out bit by bit for one scan line with a beam detection signal from the beam detector 116 (in FIG. 5) as a trigger signal, and then the data as read out are added to a laser modulating control circuit 211. While the reflecting surface of the scanner 113 is scanning the photosensitive drum along a line perpendicular to its rotational direction, a signal 211a from the laser modulating control circuit 211 is added to the laser element 108 through a temperature control circuit 216, whereby a bright-and-dark pattern for one scan line is given to the photosensitive drum 102. The data from the first and second line buffers 207, 208 are alternately read out by the controlling operation of the buffer switch control circuit 209. In other words, while the data are being read out from one of the buffers, the data are written in the other line buffer. By this system, all the data can be added to the modulator without failure, even when a time interval between the initial scanning and the subsequent scanning is very short for the scanner 112 to scan on the photosensitive drum 102. During the scanning for one scan line, the photosensitive drum 102 continues its constant speed rotation to move for an appropriate space interval for the scan line. Further, when a printer control circuit 212 which controls the printing section 101 receives a start instruction from the instruction execution circuit 204, it starts the printing operation. At the same time, those signals such as a printer ready signal 212a, a scan ready signal 213a to be led out of a scanner driving circuit 213 which controls the scanner 113, and a laser operation temperature ready signal 216a to be led out of a temperature control circuit 216 are returned to the instruction execution circuit 204. When a signal is added to the laser oscillator 108, and the initial data for the first page are written on the photosensitive drum, the recording paper 106a is fed out of the paper feeding device 106 with such a timing that the data as written on the photosensitive drum may be transferred onto just the head part of the page at the image transfer position. In this manner, the character and pattern information from the computer 201 are produced on a sheet of plain paper as a clear hard copy.

By the use of the above-described semiconductor laser device, in which the rear beam of the semiconductor laser is prevented from being emitted from the optical window of the device such as the laser recording device, it becomes possible to obtain an extremely clear and sharp image free from ghost on the image.

The present invention is not limited to the embodiments as described in the foregoing, but various changes and modifications may be made within the spirit and scope of the invention as recited in the appended claims.

What I claim is:

1. A semiconductor laser device, comprising:
(a) semiconductor laser means for generating a front laser beam and a rear laser beam;
(b) a casing for covering said semiconductor laser means and provided with an optical window for transmitting the front laser beam generated by said semiconductor laser means therethrough; and
(c) antireflecting means coated on at least a portion of the internal walls of said casing in order to prevent the rear laser beam generated by said semiconductor laser means from being reflected to and transmitted through said optical for emission from said casing window.

2. A semiconductor laser device according to the claim 1, wherein said antireflecting means comprises a scattering means for scattering said rear laser beam.

3. A semiconductor laser device according to the claim 1, wherein said antireflecting means comprises absorbing means capable of absorbing light in the oscillating wavelength range characteristic of said semiconductor laser means.

4. A semiconductor laser device, comprising:
(a) a semiconductor laser means for generating a front laser beam and a rear laser beam;
(b) a casing for covering said semiconductor laser means and provided with an optical window for transmitting the front laser beam generated by said semiconductor laser means; therethrough; and
(c) antireflecting means provided on a surface irradiated by the rear laser beam generated by said semiconductor laser means in order to prevent the rear laser beam from being reflected to and transmitted through said optical window for emission from said casing, said antireflecting means comprising a matting material for scattering the rear laser beam.

5. A semiconductor laser device, comprising:
(a) semiconductor laser device for generating a front laser beam and a rear laser beam;
(b) a casing for covering said semiconductor laser means and provided with an optical window for transmitting the front laser beam generated by said semiconductor laser means; therethrough; and
(c) antireflecting means provided on a surface of said device irradiated by the rear laser beam generated by said semiconductor laser means in order to prevent the rear laser beam from being reflected to and transmitted through said optical window for emission from said casing, said antireflecting means comprising powdered silica for scattering rear laser beam.

6. A semiconductor laser device, comprising:
(a) semiconductor laser device for generating a front laser beam and a rear laser beam;
(b) a casing for covering said semiconductor laser means and provided with an optical window for transmitting the front laser beam generated by said semiconductor laser means; therethrough; and
(c) antireflecting means provided on a surface of said device irradiated by the rear laser beam generated by said semiconductor laser means and comprising absorbing means capable of absorbing the light in the oscillating wavelength range characteristic of said semiconductor laser means in order to prevent the rear laser beam from being reflected to and transmitted through said optical window for emission from said casing.

7. A semiconductor laser device according to claim 6, further comprising support means for supporting said semiconductor laser means in said casing.

8. A semiconductor laser device according to claim 6, wherein said absorbing means comprises a member containing nigrocin.

9. A semiconductor laser device according to claim 6, wherein said absorbing means comprises a member containing carbon black.

10. A semiconductor laser device, comprising:
(a) semiconductor laser device for generating a front laser beam and a rear laser beam;
(b) a casing for covering said semiconductor laser means and provided with an optical window for transmitting the front laser beam generated by said semiconductor laser means; therethrough, the laser beam emitting portion of said semiconductor laser means being positioned directly below the center of said optical window;
(c) support means for supporting said semiconductor laser means in said casing; and
(d) blocking means provided on a surface within said casing irradiated by the rear laser beam generated by said semiconductor laser means in order to prevent the rear laser beam being reflected to and transmitted through said optical window for emission from said casing, said blocking means comprising an inclined reflecting face positioned at an oblique angle to the exit face of the front laser beam, dimension of said inclined reflecting face in the direction perpendicular to that in which the front laser beam is emitted from the position directly below the center of said optical window being at least equal to ¼ of the maximum diameter of said optical window.

11. A semiconductor laser device, comprising:
(a) semiconductor laser device for generating a front laser beam and a rear laser beam;
(b) a casing for covering said semiconductor laser means and provided with an optical window for transmitting the front laser beam generated by said semiconductor laser means therethrough;
(c) support means for supporting said semiconductor laser means in said casing; and
(d) antireflecting means provided on said support means in an area irradiated by the rear laser beam generated by said semiconductor laser means in order to prevent the rear laser beam being reflected to and transmitted through said optical window for emission from said casing.

12. A semiconductor laser device according to claim 11, wherein said antireflecting means comprises an inclined reflecting face positioned at an oblique angle to the exit face of said front laser beam; and wherein the dimension of said inclined reflecting face in the direction perpendicular to that in which the front laser beam is emitted is at least equal to ¼ of the maximum diameter of said optical window.

13. A semiconductor laser device, comprising:
(a) semiconductor laser device for generating a front laser beam and a rear laser beam;
(b) a casing for covering said semiconductor laser means and provided with an optical window for transmitting the front laser beam generated by said semiconductor laser means therethrough;
(c) a fiber cable for guiding the rear laser beam generated by said semiconductor laser means in a direction different from the direction of the front laser beam as it is transmitted through said optical window; and
(d) a cavity into which one end of said fiber cable leads for attenuating within said cavity said rear laser beam guided thereto by said fiber cable.

14. A semiconductor laser device according to claim 13, further comprising support means for supporting said semiconductor laser means in said casing, and wherein said cavity is provided on a part of said support means.

15. A semiconductor laser device according to claim 13 wherein said cavity is provided outside of said casing.

16. A semiconductor laser device, comprising:
(a) semiconductor laser device for generating a front laser beam and a rear laser beam;

(b) a casing for covering said semiconductor laser means and provided with an optical window for transmitting the front laser beam generated by said semiconductor laser means therethrough;

(c) blocking means for attenuating the rear laser beam generated by said semiconductor laser means totally inside of said casing in order to prevent the rear laser beam from being reflected to and transmitted through said optical window for emission from said casing.

17. A laser recording apparatus, comprising:

(a) semiconductor laser means for generating a front laser beam and a rear laser beam;

(b) scanning means for scanning said recording medium with the front laser beam generated by said semiconductor laser means;

(c) modulating means for modulating the output intensity of the front laser beam generated by said semiconductor laser means;

(d) a casing for covering said semiconductor laser means and provided with an optical window for transmitting the front laser beam generated by said semiconductor laser means therethrough, to emit the front laser beam from a position directly below the center of said optical window; and (e) support means for supporting said semiconductor laser means in said casing;

(f) blocking means provided on a surface of said device irradiated by the rear laser beam generated by said semiconductor laser means in order to prevent said rear laser beam being reflected to and transmitted through said optical window for emission from said casing, in said blocking means comprising an inclined reflecting face positioned at an oblique angle to the exit face of said front laser beam; the dimension of said inclined reflecting face in the direction perpendicular to the direction in which front laser beam is emitted from said position directly below the center of the optical window being at least equal to ¼ of the maximum diameter of said optical window.

18. A laser recording device according to the claim 17, wherein said recording medium is an electrophotosensitive member.

19. A recording laser device according to the claim 17, wherein said modulating means is an internal modulator for modulating electric current flowing through said semiconductor laser means.

* * * * *